Figure 1:
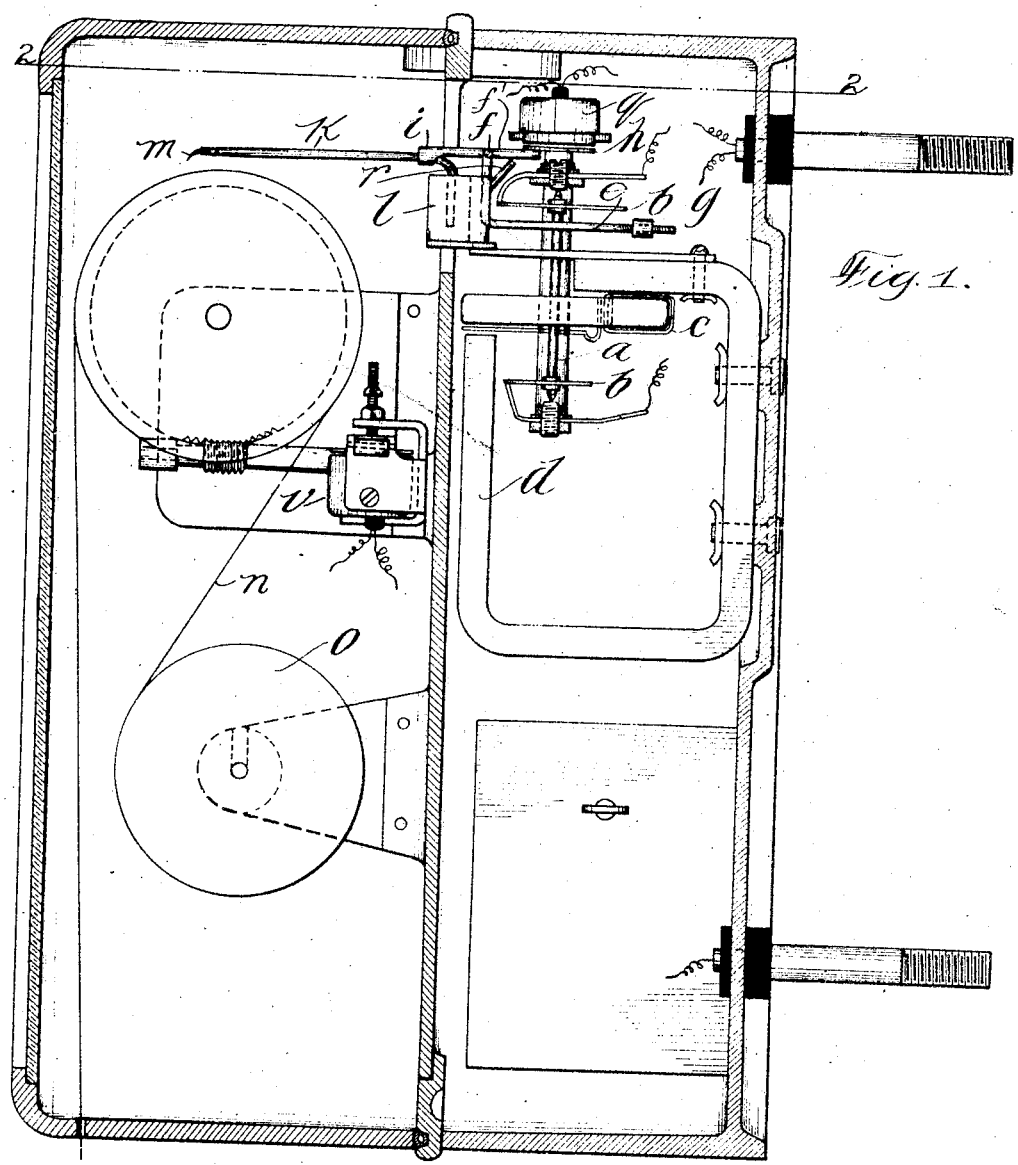

J. HARRIS.
RECORDING INSTRUMENT.
APPLICATION FILED AUG. 4, 1908.

926,869.

Patented July 6, 1909.
3 SHEETS—SHEET 1.

WITNESSES:

INVENTOR.
Jesse Harris
BY
ATTORNEY.

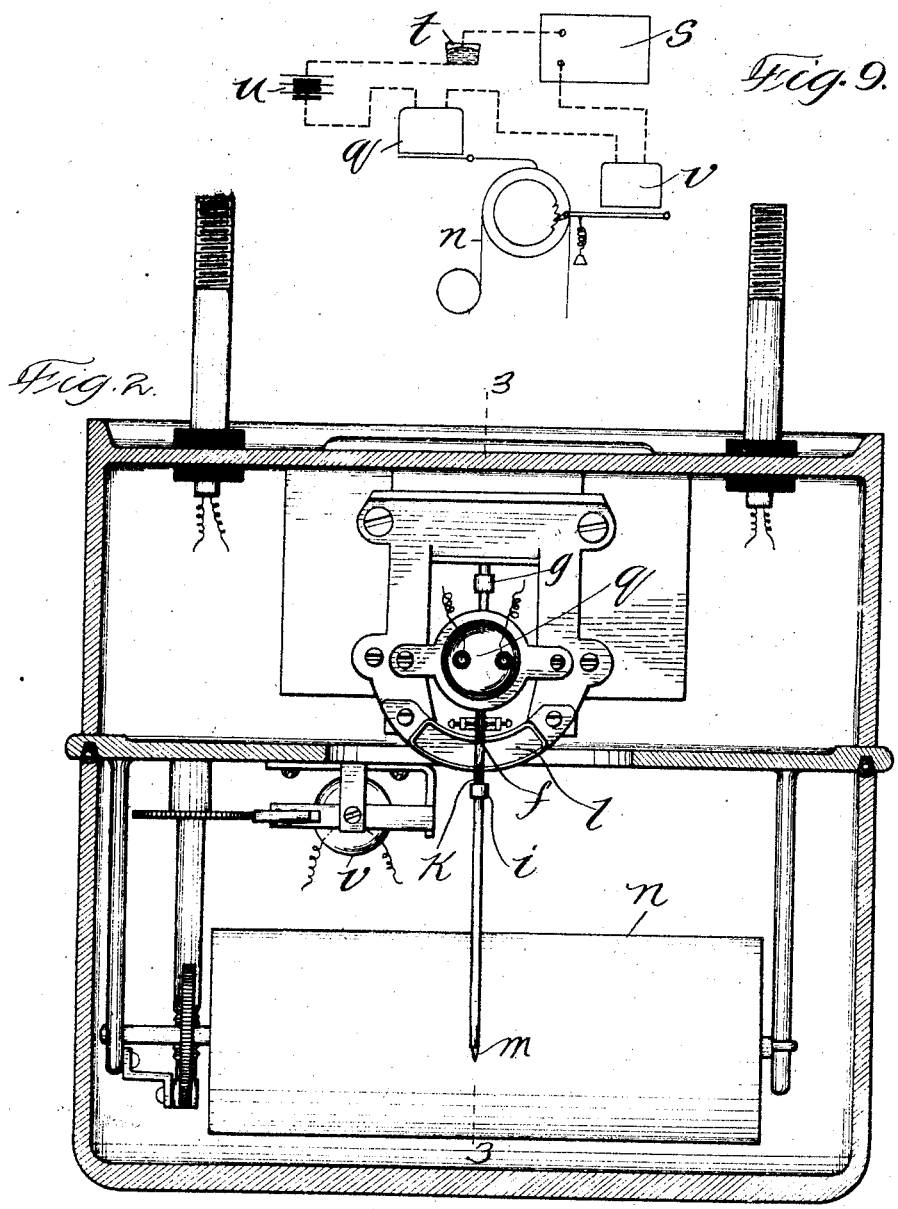

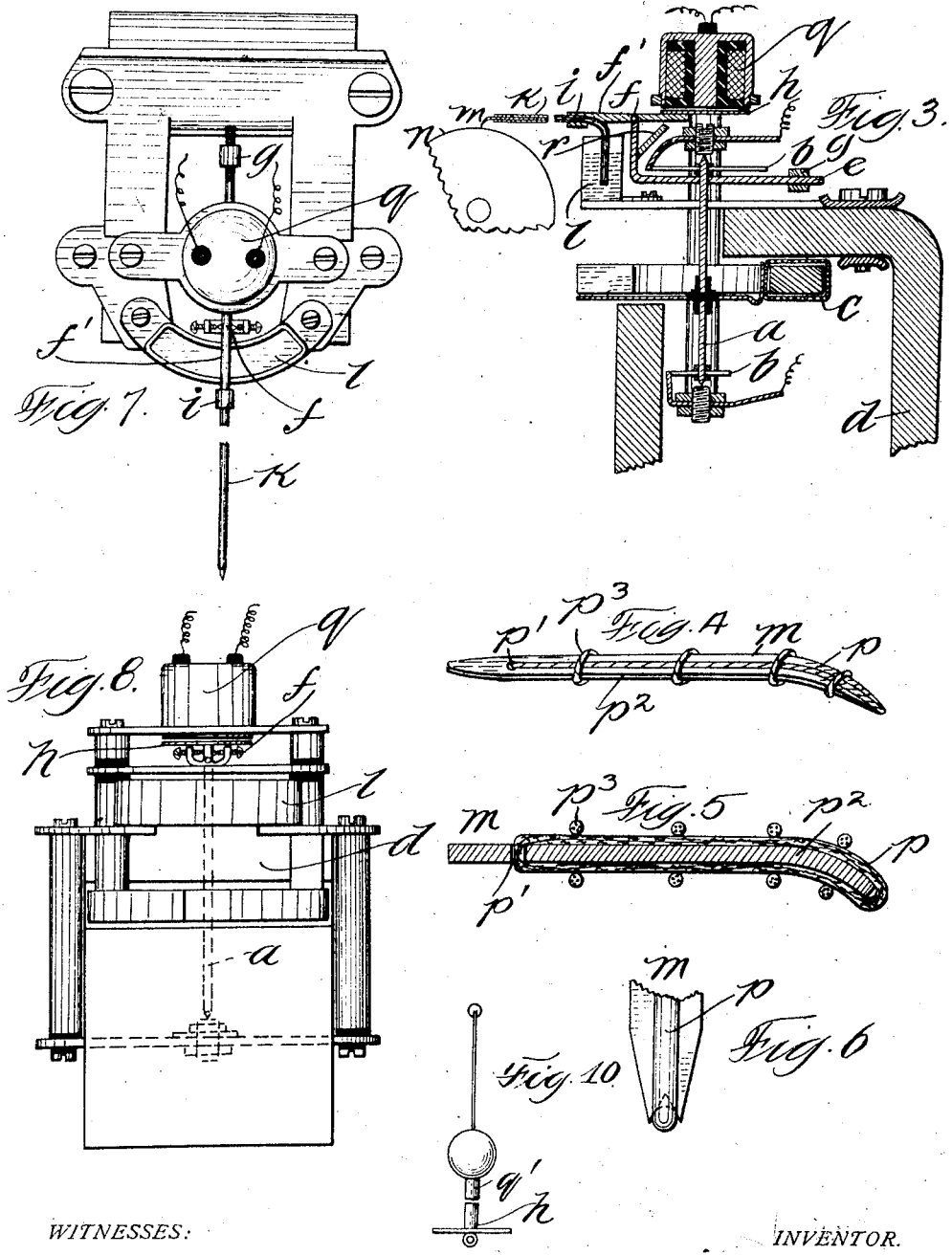

UNITED STATES PATENT OFFICE.

JESSE HARRIS, OF WEST LA FAYETTE, INDIANA, ASSIGNOR TO CENTRAL LABORATORY SUPPLY COMPANY, OF LA FAYETTE, INDIANA, A CORPORATION OF INDIANA.

RECORDING INSTRUMENT.

No. 926,869.

Specification of Letters Patent.

Patented July 6, 1909.

Application filed August 4, 1908. Serial No. 446,860.

*To all whom it may concern:*

Be it known that I, JESSE HARRIS, a citizen of the United States, residing at West La Fayette, in the county of Tippecanoe and State of Indiana, have invented a certain new and useful Improvement in Recording Instruments, of which the following is a full, clear, concise, and exact description, reference being had to the accompanying drawings, forming a part of this specification.

My invention relates to recording instruments in which a pen or stylus is employed for making recording marks upon record sheets, certain features of the invention relating to the marking device adapted to be employed in recording instruments generally and other features of the invention relating to the apparatus whereby the application of the marker to the recording sheet is controlled.

I will explain my invention more fully by reference to the accompanying drawings, showing an embodiment thereof, in which—

Figure 1 is a side elevation, partially in section, of an instrument constructed in accordance with the invention. Fig. 2 is a sectional plan view on line 2 2 of Fig. 1. Fig. 3 is a sectional view on line 3 3 of Fig. 2. Fig. 4 is a perspective view of a portion of the marking element. Fig. 5 is a longitudinal sectional view of the portion shown in Fig. 4. Fig. 6 is an end view of the structure shown in Figs. 4 and 5. Fig. 7 is a plan view of a portion of the structure. Fig. 8 is an elevation of the mechanism shown in Fig. 7. Fig. 9 is a diagrammatic view. Fig. 10 shows a modification of the structure illustrated in Figs. 1 to 9, inclusive.

Like parts are indicated by similar characters of reference throughout the different figures.

The instrument illustrated is an electrical instrument employing a movement which is shown in my application Serial No. 336,317, filed September 26, 1906, though I do not wish to be limited to the particular movement employed. It should suffice to say that the shaft $a$ of the movement is turned against the force of spiral springs $d$ by means of the armature $c$ carried by the shaft and moving within a field of magnetism furnished by the permanent magnet $d$. If, for example, the instrument were a recording volt meter the winding of the armature $c$ would be subject to the pressure, the movement of the shaft $a$ varying with such pressure. The motion imparted to the shaft $a$ is communicated to a bracket $e$ fixed thereon and which pivotally supports the marking mechanism at $f$ upon one side of the shaft and carries a counter-weight $g$ adjustable along the bracket $e$ to equalize the weight imposed upon both sides of the shaft $a$ by the bracket $e$ and parts carried thereby.

The portion of the marking mechanism immediately pivoted upon the bracket $e$ at $f$ is in the form of an arm carrying an armature $h$ at one end and a socket $i$ at the other end, the marking fluid transfer tube $k$ being received within the socket. The tube $k$ is downwardly deflected at its inner end so as to dip within an arc-shaped marking fluid supply reservoir $l$. The outer end of the tube $k$ carries a marking device $m$ which is received within the bore of said tube and which is downwardly curved so that it may be delicately applied to the record sheet $n$, which, if desired, may be unwound from the reel $o$ by means of suitable mechanism. The marking device includes a wicking $p$ that serves to convey the ink or marking fluid from the marking fluid supply reservoir $l$ to the place upon the marking device that is applied to the record sheet. The wicking $p$ may be in the form of a number of strands of thread, such, for example, as is ordinarily used in sewing on buttons, each strand preferably extending through the bore of the tube $k$ and parallel therewith so as to be untwisted together. The wicking passes through an aperture $p^1$ in the rigid pen-shaped portion $p^2$ of the marking device and is tied to said portion of said marking device by means of thread $p^3$. The wicking is turned back upon itself after having been passed between the nibs formed by a notch in the pen-shaped structure, as indicated in Figs. 4 and 5, whereby a bight is provided in the wicking at the nibs of the pen-like element. The wicking is the portion of the marking device that I preferably apply to the record sheet and the portion of the wicking that is thus applied to the record sheet is the bight thereof located at the nibs of the pen-shaped device $p^2$, said nibs protecting the wicking from undue wear upon record sheets. This use of the wicking is an important characteristic of my present invention, for when it is employed to do all of the inking upon the record sheet, the record sheet is not liable to be flooded or blotted by the ink, this objection being commonly attendant upon the operation of recording instruments of the prior art, particularly when the marking devices of such prior instruments are permitted to contact too long with one spot on the record sheet and are brought into contact too often with the same spot of the record sheet. By the use of the wicking of my invention, the flooding or blotting is entirely eliminated and the pen can operate continuously at one place upon the record sheet without flooding the same with ink or making the spot materially larger than that which would be obtained by a single touch of the marking device on the record sheet. Furthermore, by the use of the wicking, particularly when such wicking is composed of substantially parallel strands of thread, the capillary action is such as to enable said wicking to contain at all times just enough ink to provide the necessary marking. With other forms of marking devices, there is much trouble to contend with when the ink used is of different densities; that is, if the ink by chance should be too thin, it is liable to flow out upon or flood the paper, and if too thick, the markings are liable to stop altogether. The markings made by the marking device of my invention, are free of trouble due to inks of different densities. By reason of the wicking being at all times wet, owing to capillary action, the marking is made possible no matter how light the touch with which the marking device is applied to the record sheet. While the wicking is always wet, with the attendant advantage last stated, yet the extent to which the wicking is wet is automatically limited to avoid blotting action, this characteristic being very important, as a great range of demand is made upon the ink needed in recording a widely fluctuating load or a steady load.

In common with recording instruments that have long been known, the marking device is applied to the record sheet intermittently. In the apparatus of my invention, the marking device is intermittently applied to the record sheet by means of an electro-magnet $q$ having an axis coincident with the axis of the shaft $a$ and coöperatively related with the disk-shaped armature $h$ which is preferably interposed between the magnet $q$ and the upper bearing for said shaft. The armature carrying end of the intermediately pivoted arm $f^1$ is slightly more burdened than the other end of the arm, so that when the electro-magnet $q$ is deënergized the armature end of said arm $f^1$ is allowed to descend and rest upon a stop $r$, the pen then being removed from the record sheet. The armature is shown in an attracted position in Fig. 3 and in an unattracted position in Fig. 1.

The full flux of the operating magnet $q$ acts upon the armature $h$ at all positions of the marking device, which is due to the co-axial arrangement of the magnet and its armature with respect to the shaft $a$, for it will be seen that no matter in what position the marking device may be placed, the relative position of the armature and the magnet is not changed.

In prior devices, the electro-magnets employed for applying the marking elements to the record sheets were similar to sections or sectors cut from circles having diameters of twelve or fifteen inches and having cores of U shape about a half inch deep. The coil of each of such magnets was bound upon one of the limbs of the U-shaped core and required about six ounces of wire, with the consumption of about one-half ampere to operate the magnet. The magnet $q$ included in the recording instrument of my invention takes a small fraction of a watt to operate it and is only about one-twentieth of the weight of the corresponding magnet of the prior art. Furthermore, the attractive force upon the armature in the apparatus of the prior art varied at different places along the face of the magnet, due probably to the fact that the magnetism of such prior magnet concentrated at the extreme ends or corners of the magnet and became weaker at the center of the magnet, all of these factors being liable to secure uneven operation of the instrument. In the device of my present invention, the small iron clad electro-magnet $q$ is very efficient, because of its alinement with the operating shaft $a$ and its location of less than an inch from the shaft carrying the marking device. By simply drawing up the armature one-thirty-second of an inch, the inking end of the marking device travels in moving toward the record sheet, through a distance of about one-eighth of an inch at all times irrespective of the angular deflection of the shaft $a$ and the marking device, while at the same time equality of the attractions of the armature is always assured no matter upon what part of the record sheet the marking device may be working, for the reasons which have been stated. In short, the armature attached to the pen of a recording instrument of the prior art passed over about six inches of surface from one end of the drawing magnet to the other, being attracted during its travel with varying degrees of force, whereas in the recording instrument of my invention, the armature is attracted by the same area of pole at all times.

Fig. 6 illustrates diagrammatically a familiar system for controlling the operation of the marker applying magnet $q$ and the travel of the record sheet $n$, there being indicated in Fig. 6 the clock mechanism $s$ for intermittently closing a circuit at $t$, which circuit includes a battery $u$, the electro-magnet $q$ and the record sheet feeding magnet $r$. As the arrangement diagrammatically indicated in Fig. 6 will be well understood by those skilled in the art, I will not describe it further.

Fig. 10 illustrates the modification of a permanent magnet $q'$ for the electro-magnet $q$, the permanent magnet being mounted to swing as a pendulum or being attached to a pendulum as to be periodically brought within range of the armature $h$. In Fig. 10 I have only illustrated the association of the swinging pendulum magnet $q'$ with the armature $h$, as the balance of the mechanism is the same.

While I have herein shown and particularly described the preferred embodiment of my invention, I do not wish to be limited to the precise details of construction shown, as changes may readily be made without departing from the spirit of the invention.

Having thus described my invention, I claim as new and desire to secure by Letters Patent the following:

1. A recording instrument including a marking device, mechanism for effecting movement thereof with respect to a record sheet, said marking device including wicking for transferring marking fluid to the point of application and extending close to the place of contact of the marking device with the record sheet, and a guarding element having a notch receiving the portion of the wicking adjacent to the record sheet to guard said wicking portion from wear.

2. A recording instrument including a marking device, mechanism for effecting movement thereof with respect to a record sheet, said marking device including wicking for transferring marking fluid to the point of application and itself serving to contact with the record sheet to mark the same, and a guarding element having a notch receiving the portion of the wicking adjacent to the record sheet to guard said wicking portion from wear.

3. A recording instrument including a marking device, and mechanism for effecting movement thereof with respect to a record sheet, said marking device including wicking for transferring marking fluid to the point of application, the wicking being returned upon itself to form a bight therein at the point of contact.

4. A recording instrument including a marking device, and mechanism for effecting movement thereof with respect to a record sheet, said marking device including wicking for transferring marking fluid to the point of application and itself serving to contact with the record sheet to mark the same, the wicking being returned upon itself to form a bight therein at the point of contact.

5. A recording instrument including a marking device, mechanism for effecting movement thereof with respect to a record sheet, said marking device including wicking for transferring marking fluid to the point of application and extending close to the place of contact of the marking device with the record sheet, the wicking being returned upon itself to form a bight therein at the point of contact, and a guarding element to relieve the portion of the wicking adjacent to the record sheet of wear.

6. A recording instrument including a marking device, mechanism for effecting movement thereof with respect to a record sheet, said marking device including wicking for transferring marking fluid to the point of application and extending close to the place of contact of the marking device with the record sheet, the wicking being returned upon itself to form a bight therein at the point of contact, and a guarding element having a notch receiving the portion of the wicking adjacent to the record sheet to guard said wicking portion from wear.

7. A recording instrument including a marking device, mechanism for effecting movement thereof with respect to a record sheet, said marking device including wicking for transferring marking fluid to the point of application and itself serving to contact with the record sheet to mark the same, the wicking being returned upon itself to form a bight therein at the point of contact, and a guarding element to relieve the portion of the wicking adjacent to the record sheet of wear.

8. A recording instrument including a marking device, mechanism for effecting movement thereof with respect to a record sheet, said marking device including wicking for transferring marking fluid to the point of application and itself serving to contact with the record sheet to mark the same, the wicking being returned upon itself to form a bight therein at the point of contact, and a guarding element having a notch receiving the portion of the wicking adjacent to the record sheet to guard said wicking portion from wear.

9. A recording instrument including a marking device, mechanism for effecting movement thereof with respect to a record sheet, said marking device including wicking formed of a plurality of thread strands substantially untwisted together, for transferring marking fluid to the point of application and extending close to the place of contact of the marking device with the record sheet, and a guarding element having a notch receiving the portion of the wicking adjacent to the record sheet to guard said wicking portion from wear.

10. A recording instrument including a marking device, mechanism for effecting movement thereof with respect to a record sheet, said marking device including wicking formed of a plurality of thread strands substantially untwisted together, for transferring marking fluid to the point of application and itself serving to contact with the record sheet to mark the same, and a guarding element having a notch receiving the portion of the wicking adjacent to the record sheet to guard said wicking portion from wear.

11. A recording instrument including a marking device, and mechanism for effecting movement thereof with respect to a record sheet, said marking device including wicking formed of a plurality of thread strands substantially untwisted together, for transferring marking fluid to the point of application, the wicking being returned upon itself to form a bight therein at the point of contact.

12. A recording instrument including a marking device, and mechanism for effecting movement thereof with respect to a record sheet, said marking device including wicking formed of a plurality of thread strands substantially untwisted together, for transferring marking fluid to the point of application and itself serving to contact with the record sheet to mark the same, the wicking being returned upon itself to form a bight therein at the point of contact.

13. A recording instrument including a marking device, mechanism for effecting movement thereof with respect to a record sheet, said marking device including wicking formed of a plurality of thread strands substantially untwisted together, for transferring marking fluid to the point of application and extending close to the place of contact of the marking device with the record sheet, the wicking being returned upon itself to form a bight therein at the point of contact, and a guarding element to relieve the portion of the wicking adjacent to the record sheet of wear.

14. A recording instrument including a marking device, mechanism for effecting movement thereof with respect to a record sheet, said marking device including wicking formed of a plurality of thread strands substantially untwisted together, for transferring marking fluid to the point of application and extending close to the place of contact of the marking device with the record sheet, the wicking being returned upon itself to form a bight therein at the point of contact, and a guarding element having a notch receiving the portion of the wicking adjacent to the record sheet to guard said wicking portion from wear.

15. A recording instrument including a marking device, mechanism for effecting movement thereof with respect to a record sheet, said marking device including wicking formed of a plurality of thread strands substantially untwisted together, for transferring marking fluid to the point of application and itself serving to contact with the record sheet to mark the same, the wicking being returned upon itself to form a bight therein at the point of contact, and a guarding element to relieve the portion of the wicking adjacent to the record sheet of wear.

16. A recording instrument including a marking device, mechanism for effecting movement thereof with respect to a record sheet, said marking device including wicking, formed of a plurality of thread strands substantially untwisted together, for transferring marking fluid to the point of application and itself serving to contact with the record sheet to mark the same, the wicking being returned upon itself to form a bight therein at the point of contact, and a guarding element having a notch receiving the portion of the wicking adjacent to the record sheet to guard said wicking portion from wear.

17. A recording instrument including a marking device mounted upon an arm provided with a mounting upon which the arm may swing to apply the marking device to and remove it from the record sheet, mechanism for turning said arm together with its mounting to move the marking device over the record sheet, and a magnet provided with an armature upon said arm located substantially in line with the axis of movement of said arm-turning mechanism.

18. A recording instrument including a marking device mounted upon an arm provided with a mounting upon which the arm may swing to apply the marking device to and remove it from the record sheet, mechanism for turning said arm together with its mounting to move the marking device over the record sheet, and a magnet provided with a disk-shaped armature upon said arm substantially co-axial with the axis of movement of said arm-turning mechanism.

19. A recording instrument including a marking device mounted upon an arm provided with a mounting upon which the arm may swing to apply the marking device to and remove it from the record sheet, mechanism for turning said arm together with its mounting to move the marking device over the record sheet, and a magnet provided with an armature upon said arm located substantially in line with the axis of movement of said arm-turning mechanism, the point of application of the marking device being upon one side of the arm mounting and the magnet being upon the other side of said mounting.

20. A recording instrument including a marking device mounted upon an arm provided with a mounting upon which the arm may swing to apply the marking device to and remove it from the record sheet, mechanism for turning said arm together with its mounting to move the marking device over the record sheet, and a magnet provided with a disk-shaped armature upon said arm substantially co-axial with the axis of movement of said arm-turning mechanism, the point of application of the marking device being upon one side of the arm mounting and the magnet being upon the other side of said mounting.

21. A recording instrument including a marking device mounted upon an arm provided with a mounting upon which the arm may swing to apply the marking device to and remove if from the record sheet, mechanism for turning said arm together with its mounting to move the marking device over the record sheet, and a magnet located substantially in line with the axis of movement of said arm-turning mechanism, the point of application of the marking device being upon one side of the arm mounting and the magnet being upon the other side of said mounting.

22. A recording instrument including a marking device mounted upon an arm provided with a mounting upon which the arm may swing to apply the marking device to and remove it from the record sheet, mechanism for turning said arm together with its mounting to move the marking device over the record sheet, and a magnet substantially co-axial with the axis of movement of said arm-turning mechanism, the point of application of the marking device being upon one side of the arm mounting and the magnet being upon the other side of said mounting.

23. A recording instrument including a marking device mounted to permit its movement toward and from the record sheet, mechanism for moving the marking device over a record sheet, and a magnet acting in line with the axis of movement of said mechanism and serving intermittently to move the marking device transversely to the face of the record sheet, to apply the marking device to the record sheet.

24. A recording instrument including a marking device mounted to permit its movement toward and from the record sheet, mechanism for moving the marking device over a record sheet, and a magnet having an armature intermittently attracted to move the marking device transversely to the face of the record sheet, to apply the marking device to the record sheet and maintained in substantially uniform operative relation with the balance of the electro-magnet, and operating substantially in the axis of movement of the mechanism employed for moving the marking device over the record sheet.

25. A recording instrument including a marking device mounted to permit its movement toward and from the record sheet, mechanism for moving the marking device over a record sheet, and a magnet having an armature with a range of movement substantially fixed operatively with respect to the balance of the magnet, said armature being intermittently attracted to move the marking device transversely to the face of the record sheet, to apply the marking device to the record sheet, said armature also operating substantially in the axis of movement of the mechanism employed for moving the marking device over the record sheet.

26. A recording instrument including a marking device mounted to permit its movement toward and from the record sheet, mechanism for moving the marking device over a record sheet, and means acting in line with the axis of movement of said mechanism serving intermittently to move the marking device transversely to the face of the record sheet, to apply the marking device to the record sheet.

27. A recording instrument including a marking device mounted to permit its movement toward and from the record sheet, mechanism for moving the marking device over a record sheet, and means for intermittently moving the marking device toward the record sheet and acting with uniform force upon the marking device irrespective of the position of the marking device.

In witness whereof, I hereunto subscribe my name.

JESSE HARRIS.

Witnesses:
W. BURT WILSON,
J. WALTER ESTERHUE.